(12) United States Patent
Rubin (10) Patent No.: US 7,840,518 B1
(45) Date of Patent: Nov. 23, 2010

(54) SYSTEM AND METHOD FOR OBJECT RECOGNITION UTILIZING FUSION OF MULTI-SYSTEM PROBABALISTIC OUTPUT

(75) Inventor: Stuart Harvey Rubin, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 703 days.

(21) Appl. No.: 11/849,428

(22) Filed: Sep. 4, 2007

(51) Int. Cl.
*G06N 5/00* (2006.01)
(52) U.S. Cl. .......................................... 706/47; 706/45
(58) Field of Classification Search .................. 706/47, 706/45
See application file for complete search history.

(56) References Cited

U.S. PATENT DOCUMENTS 7,047,226 B2   5/2006   Rubin

OTHER PUBLICATIONS

Demirekler, et al, Plurafity Voting-Based Multiple Classifier Systems: Statistically Independent With Respect to Dependent Classifier Sets, Pattern Recognition 35, 2002, pp. 2365-2379.*
Rubin, Stuart H., "On Randomization and Discovery", Journal of Informational Sciences, vol. 177, issue 1, pp. 170-191, Jan. 2007.
Rubin, Stuart H., "On the Auto-Randomization of Knowledge," Proc. IEEE Int. Conf. Info. Reuse and Integration, Las Vegas, NV, pp. 308-313, 2004.
Rubin, S.H., Murthy, S.N.J., Smith, N.H., and Trajkovic, L., "Kaser: Knowledge Amplification by Structured Expert Randomization," IEEE Transactions on Systems, Man, and Cybernetics—Part B: Cybernetics, vol. 34, No. 6, pp. 2317-2329, Dec. 2004.
Chaitin, G.J., "Randomness and Mathematical Proof," Sci. Amer., vol. 232, No. 5, pp. 47-52, 1975.
Chaitin, G.J., "Information-Theoretic Limitations of Formal Systems," Journal of the Association for Computing Machinery, vol. 21, pp. 403-424, 1974.
Rubin, Stuart H., "Computing With Words", IEEE Transactions on Systems, Man, and Cybernetics—Part B: Cybernetics, vol. 29, No. 4, pp. 518-524, Aug. 1999.
Liang, Q.A., Rubin, Stuart H., "Randomized Local Extrema for Heuristic Selection in TSP", Proc. IEEE Int. Conf. Info. Reuse and Integration, Waikaloa Hilton Village, HI, Sep. 16-18, 2006.

* cited by examiner

*Primary Examiner*—Wilbert L Starks, Jr.
(74) *Attorney, Agent, or Firm*—Ryan J. Friedl; Kyle Eppele (57) ABSTRACT

A method for object recognition includes generating a set of rules, using multiple systems to recognize a target object, applying the set of rules to a set of responses to determine an output, and displaying the output to a user. Each rule contains predicates and a consequent, each predicate comprising a rule token identifier and a rule probability of recognition. The rule token identifiers are generated from multiple systems. Each rule token identifier represents a system recognized object. Each rule is derived by associating a range of rule probabilities of recognition for one or more rule token identifiers to a known object. The range of rule probabilities of recognition is determined by at least one system and by combining multiple rule probabilities of recognition. Each system produces a response having a response token identifier and a response probability of recognition. Responses are combined to form the sets of responses.

22 Claims, 7 Drawing Sheets

SYSTEM AND METHOD FOR OBJECT RECOGNITION UTILIZING FUSION OF MULTI-SYSTEM PROBABALISTIC OUTPUT

FEDERALLY-SPONSORED RESEARCH AND DEVELOPMENT

The System and Method for Object Recognition Utilizing Fusion of Multi-System Probabilistic Output was developed with Federal funds and is assigned to the United States Government. Licensing and technical inquiries may be directed to the Office of Patent Counsel, Space and Naval Warfare Systems Center, San Diego, Code 20012, San Diego, Calif., 92152; telephone (619) 553-3001, facsimile (619) 553-3821. Reference Navy Case No. 98786.

BACKGROUND OF THE INVENTION

The present invention is generally related to the field of expert systems.

Intelligent systems may be used to recognize objects. Typical recognition systems are configured only to detect one particular characteristic of an object. For example, separate systems are needed to detect an object's shape, whether or not sound is emitted from the object, and whether or not any heat is emitted from an object. While separate systems may be useful, the accuracy of recognition of an object is lessened due to the system's narrow focus on one particular characteristic of an object. As an example, two distinct objects having the same shape may incorrectly be given the same classification because of the lack of ability to detect that one object radiates heat and the other does not. Incorrect recognition of objects by intelligent systems can have harmful effects in time-sensitive environments that require rapid classification.

Therefore, there is a current need for an expert system that can utilize the output of multiple systems to rapidly and more accurately recognize various objects.

DETAILED DESCRIPTION OF SOME EMBODIMENTS

Figure 1:
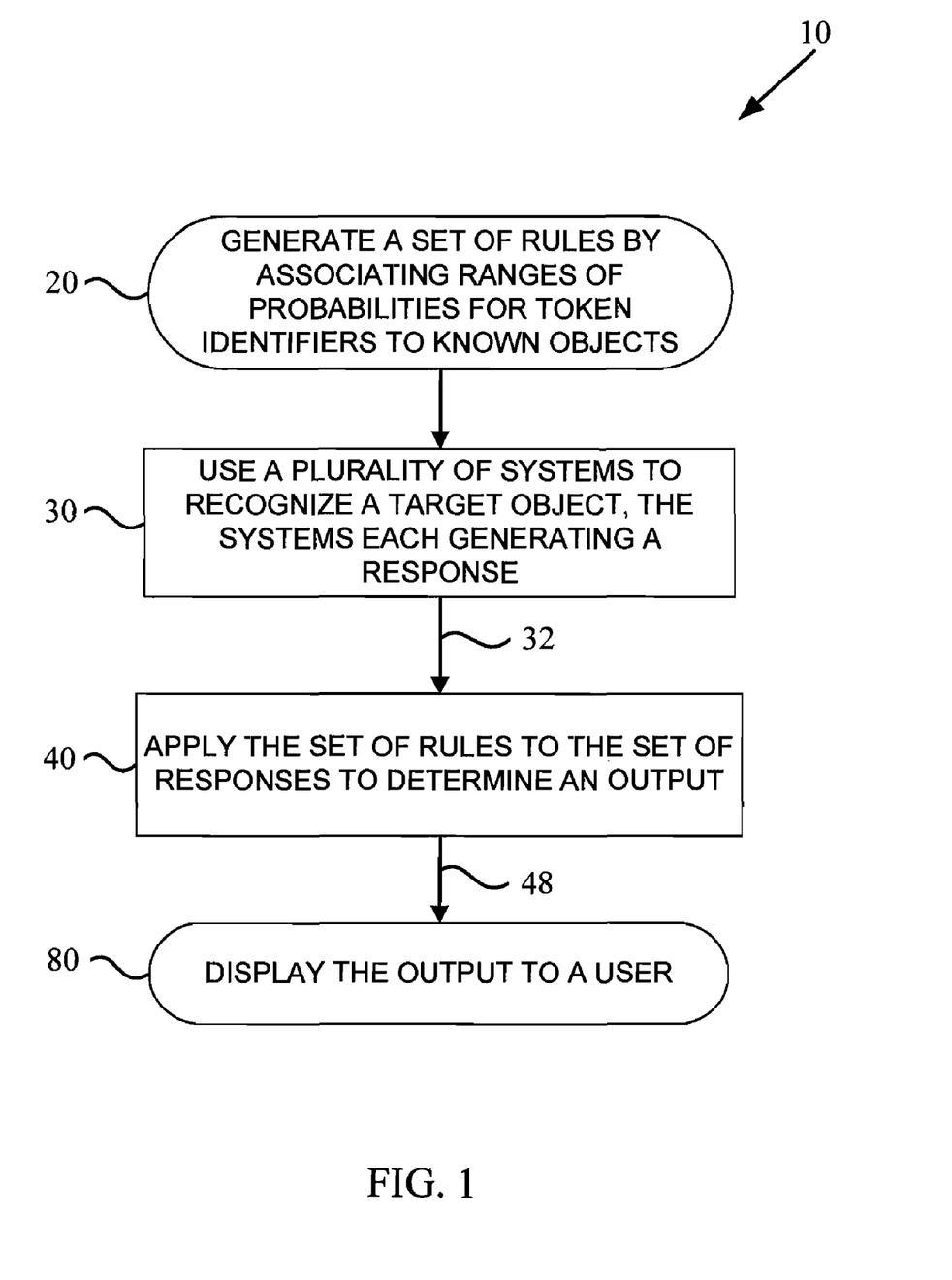
FIG. 1 shows a flowchart of one embodiment of the method for object recognition utilizing fusion of multi-system probabilistic output.

FIG. 1 shows a flowchart of one embodiment of the method for object recognition utilizing fusion of multi-system probabilistic output 10. Method 10 may be performed by a system such as system 200 shown in FIG. 5 and discussed herein. Method 10 may begin at step 20, where a set of rules is generated. In some embodiments, step 20 may occur while system 200 is in "training" mode, wherein system 200 utilizes user feedback to generate a set of rules. In other embodiments, step 20 may be performed when system 200 is in "usage" mode, wherein feedback is not utilized and only "predictions" are generated. The set of rules may be generated by a processor 220. As used herein, the term "processor" may refer to a system or chip that may at least be used to generate and/or process rules. The term "generate" may refer to bringing into existence of a set of rules. In some embodiments, the set of rules may be generated by the creation of new rules, retrieval of existing rules, and/or combination of existing rules.

Each rule of the set of rules may contain one or more predicates and a consequent. A predicate may be defined as the portion of the rule located to the left of the rule's implication. A consequent may be defined as the portion of the rule located to the right of the rule's implication. Each of the predicates may comprise a rule token identifier and a rule probability of recognition associated with the rule token identifier. A rule token identifier is a symbol, contained within a rule, used to identify a recognized object by a system. A rule probability of recognition is the probability or range of probabilities, contained within a rule, given by a system that the object was properly recognized. The consequent of each rule may contain a consequent probability of recognition, which may have a lower probability bound and an upper probability bound. The consequent probability of recognition is the probability or range of probabilities, contained within a rule, indicating the level of certainty of a rule's validity. The rule token identifiers may be generated from a plurality of systems, such as systems 270. Each system 272 may be configured to measure a different characteristic of a target object 280, such as sound, polarization of reflected light, and heat.

Each rule token identifier may represent a recognized object by at least one of the systems 272. The plurality of systems 270 may generate the rule token identifiers by comparing characteristics of the target object 280 with knowledge bases containing characteristics of known objects. The knowledge bases may be stored in a memory module 230. Each rule of the set of rules may be derived by associating a range of rule probabilities of recognition for one or more rule token identifiers to a known object. The range of rule probabilities of recognition for each rule token identifier may be determined by combining multiple rule probabilities of recognition for each rule token identifier. In some embodiments, the range of rule probabilities of recognition may be determined by the lowest rule probability of recognition and the highest rule probability of recognition for each rule token identifier. Each rule probability of recognition may be determined by at least one of the systems 272.

In some embodiments, system 200 may be configured such that step 20 may be performed in accordance with rule amplification technology. For example, system 200 may utilize a method for knowledge amplification employing structured expert randomization (KASER) as described in U.S. Pat. No. 7,046,226 to the inventor of the subject invention, the specification of which is hereby incorporated by reference herein. Use of the KASER technology may allow for a quick and accurate recognition of target objects 280. KASER technology may be useful for its ability to: 1) extrapolate an evolving basis set of rules to create an analogous virtual space of rules that are heuristically valid and whose validity increases with the scale of the system, 2) generalize rules to increase their applicability, 3) provide for a metaphorical explanation of outputs, and 4) ask questions to randomize information. If each system 272 returns one of ten possible token identifiers, and system 200 contains one-hundred systems 272, the possibility space, or the number of rules needed to close such a system, would be on the order of 10^100. Conventional expert systems do not have the capability to hold that many rules in any form of memory. The use of the KASER technology is useful in system 200, as the KASER system operates by presuming even coverage of such a space with a basis set of fundamental rules, then, learns to approximate the remainder of the space through the use of transformational analogy and to a lesser extent, other genre of machine learning.

Following step 20, step 30 may involve using the plurality of systems 270 to recognize a target object 280. Step 30 will be discussed with reference to FIG. 6. In step 30, each system, such as systems 272 may produce a response, such as signals 310, 312, and 314. The responses may comprise a response token identifier (e.g. A, B, C) and a response probability of recognition associated with each response token identifier (e.g. 0.60, 0.30, 0.10). In some embodiments, if a system 272 does not produce a response or does not return a response within a predetermined amount of time, a special "non-convergence" token may be assigned along with a defined zero response probability of recognition. The fact that a recognition may be performed without having a response from each system 272 allows for greater speed in producing an output. In some embodiments, if only one response token identifier is returned it is assigned a response probability of recognition of one. In some embodiments, when multiple response token identifiers are returned from a particular system 272, the sum of each must be equal to one. Each response may be combined to form a set of responses, such as set of signals 320, 322, and 324.

Next, step 40 may involve applying the set of rules to the set of responses to determine an output. Step 40 may be performed by processor 40. Step 40 may comprise various steps depending on the set of rules and the type of operations to be performed. For example, step 40 may involve producing a set of KASER 2 input signals 350, comprising input signals 340, 342, and 344, and performing an operation thereon, prior to producing the output, such as output 362. The output may be selected from a group of outputs stored in an object-oriented multimedia database, which may be contained within memory 230. The output may comprise an identification of a known object (e.g. D) and an identification probability of recognition (e.g. 1.0) associated with the known object. Step 40 is discussed in more detail with respect to FIG. 2. Following step 40, method 10 may conclude at step 80, wherein the output is displayed to a user on a device such as display 210.

Figure 2:
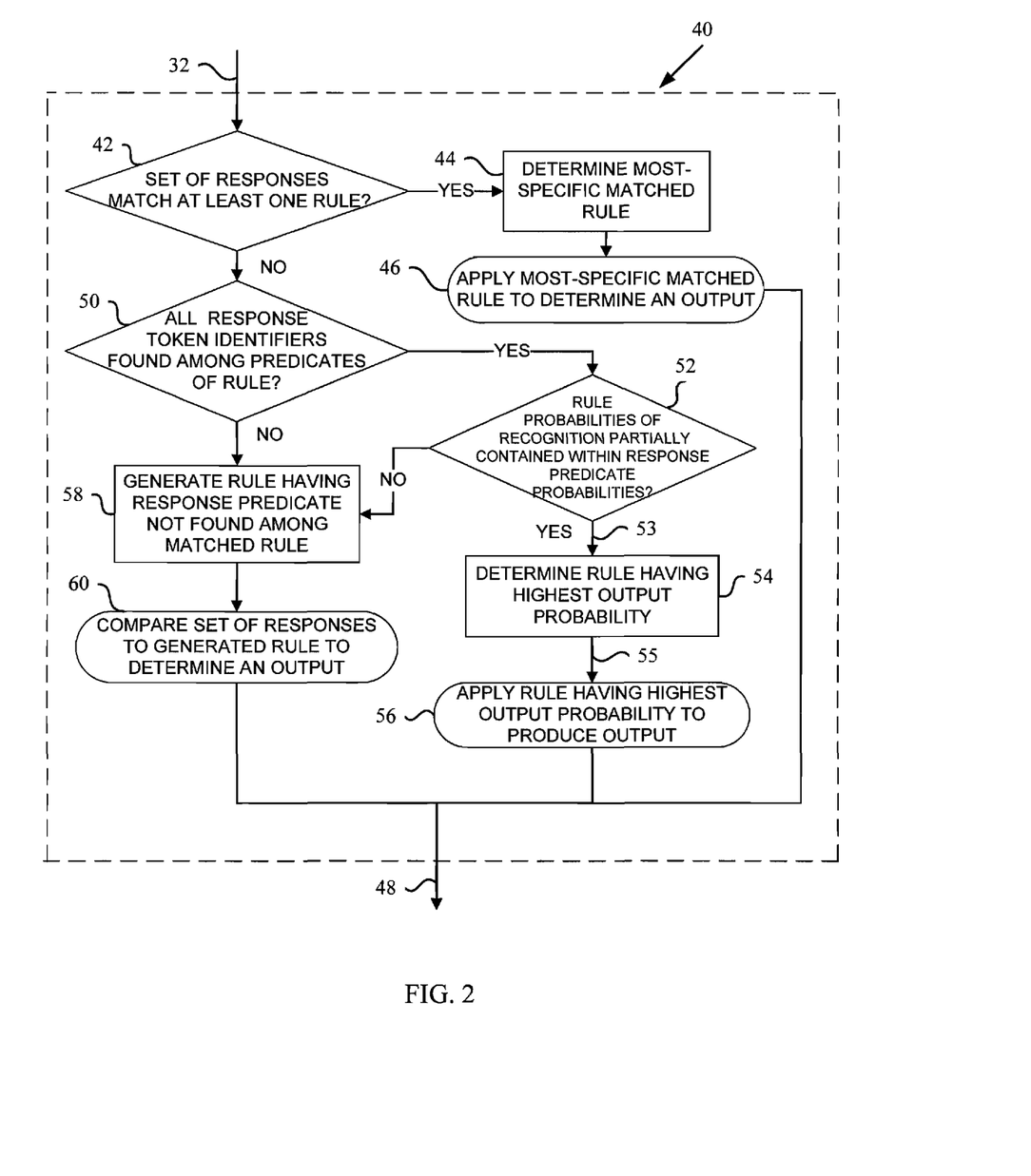
FIG. 2 shows a flowchart of one embodiment of the step for applying the set of rules to the set of responses to determine an output, in accordance with the method for object recognition utilizing fusion of multi-system probabilistic output.

FIG. 2 shows a flowchart of one embodiment of step 40. Step 40 may include multiple steps beginning at step 42, where it is determined if a set of responses matches at least one rule. As an example, a set of responses may match a rule if each response token identifier and associated response probability of recognition of the set of responses are all found among the predicates of the rule and the rule probabilities of recognition overlap the response probabilities of recognition for each of the response token identifiers (see, for example, FIG. 7). If a set of responses matches at least one rule, then step 40 proceeds to step 44, which involves determining the most-specific matched rule. The most-specific matched rule is the rule wherein the predicates of the rule most-closely match the response token identifiers, and the rule probabilities of recognition most-closely match the response probabilities of recognition for each response token identifier. Following step 44, step 46 involves applying the most-specific matched rule to determine an output. If a set of responses does not match at least one rule, step 40 may proceed to step 50, which may involve determining if all of the response token identifiers of the set of responses are all found among the predicates of the rule.

If all of the response token identifiers are not found among the predicates of the matched rule, step 40 may proceed to step 58, which involves generating a rule containing the response token identifier and associated response probability of recognition that is not found among the predicates of the matched rule. The generated rule may contain a different predicate and different consequent than the matched rule. The rule may be generated by transformative analogy of existing rules, which may include applying heuristic version space generalization and specialization to existing rules. Rule generation by transformative analogy of existing rules may include the step of combining existing rules having identical rule token identifiers, identical consequents, and overlapping predicate rule probabilities of recognition. However, in some embodiments, existing rules are not combined if the generated rule contradicts an existing rule. Following step 58, step 60 involves comparing the set of responses to the generated rule. After step 60, step 40 may proceed to step 80 (shown in FIG. 1) along flow path 48.

Referring back to step 50, if all of the response token identifiers of the set of responses are found among the predicates of the rule, step 40 may proceed to step 52, which involves determining if all of the rule probabilities of recognition are at least partially contained within the response probabilities of recognition for each response token identifier of the set of responses. If, at step 52, all of the rule probabilities of recognition are at least partially contained within the response probabilities of recognition for each response token identifier of the set of responses, step 40 may proceed along flow path 53 to step 54, where the rule having the highest output probability is determined. Step 54 is discussed more in detail with regard to FIG. 3. Following step 54, step 40 may proceed along flow path 55 to step 56, which may involve applying the rule having the highest output probability to determine an output. Following step 56, step 40 may proceed to step 80 (shown in FIG. 1) along flow path 48. If, at step 52, all of the rule probabilities of recognition are not at least partially contained within the response probabilities of recognition for each response token identifier of the set of responses, step 40 may proceed to step 58.

Figure 3:
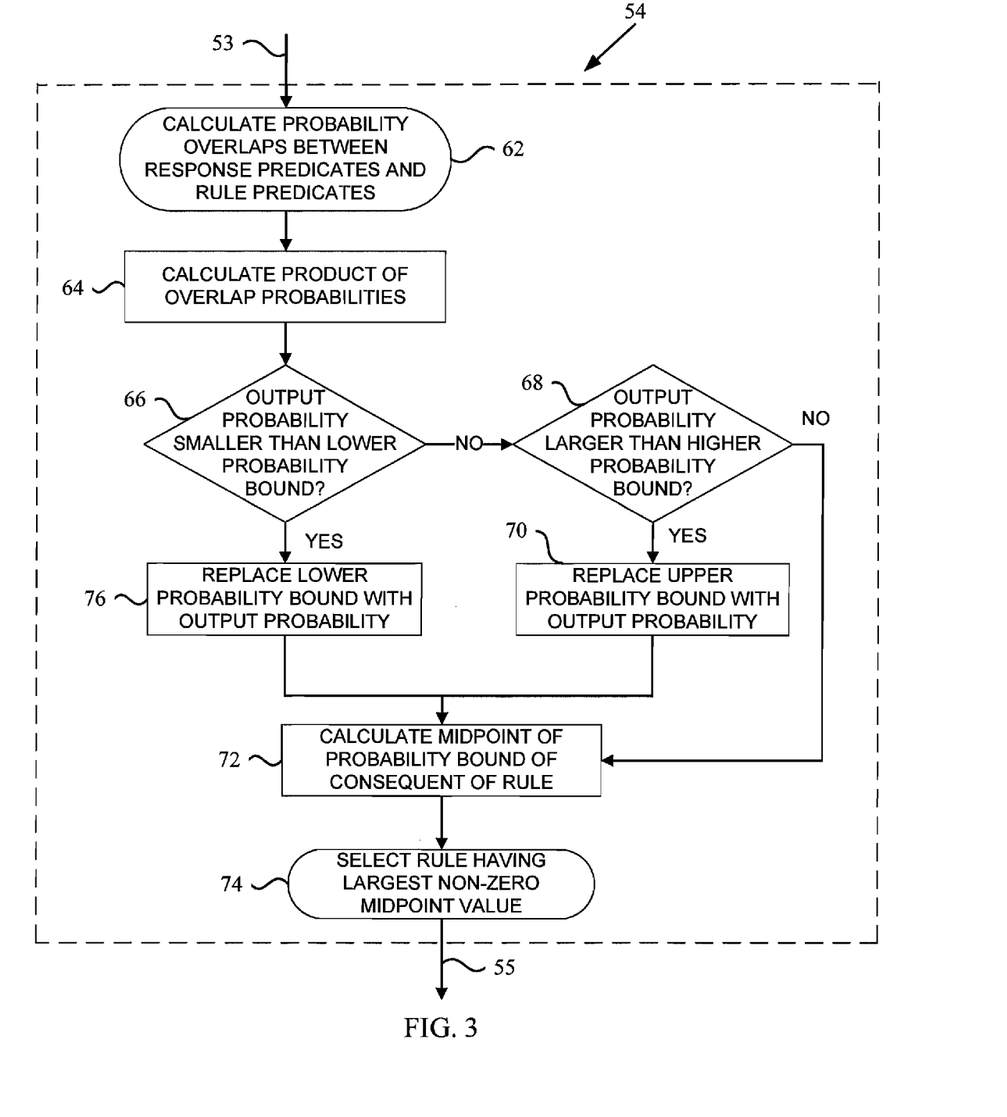
FIG. 3 shows a flowchart of one embodiment of the step for determining the rule having the highest probability output, in accordance with the method for object recognition utilizing fusion of multi-system probabilistic output.

FIG. 3 shows a flowchart of one embodiment of step 54. Step 54 may include multiple steps beginning at step 62, which may involve, for each matched rule, calculating the percentage of overlap between the response probability of recognition for each response token identifier in the set of responses to the rule probability of recognition of the corresponding predicate in the rule. The calculation may result in an overlap probability for each predicate of each matched rule. Following step 62, step 64 may involve calculating the product of the overlap rule probabilities of recognition for each rule, resulting in an output probability for each rule. After step 64, step 66 may involve determining if the output probability is smaller than the lower probability bound. If the output probability is smaller than the lower probability bound, then step 54 proceeds to step 76, where the lower probability bound is replaced with the output probability. Following step 76, step 54 may proceed to step 72, which may involve calculating the midpoint value of the consequent probability of recognition. After step 72, step 74 may involve selecting the rule having the largest non-zero midpoint value. Following step 74, step 54 may proceed to step 56 (shown in FIG. 2) along flow path 55.

Referring back to step 66, if the output probability is not smaller than the lower probability bound, step 54 may proceed to step 68 to determine if the output probability is larger than the higher probability bound. If the output probability is larger than the higher probability bound, then step 54 may proceed to step 70, which may involve replacing the higher probability bound with the output probability. If the output probability is not larger than the higher probability bound, then step 54 may proceed to step 72, discussed above. An example of step 54 is discussed more in detail below.

Example

Rule (Ri): A [0.6, 0.8], B [0.75, 0.77], C [1.0, 1.0] D [1.0, 1.0]

Response: A [0.6, 0.7], B [0.7, 0.8], C [0.2, 0.5]

Here, the response token identifiers of the predicate of the response (i.e. A, B, C), match the rule token identifiers of the predicate of the rule. However, the response ranges of probabilities of recognition associated with the response token identifiers do not match the rule ranges of probabilities of recognition. Thus, $P_j$, the probability overlap between the response predicates and the rule predicates can be determined by the following equation $$p(P) = \frac{P_{LR} - P_{UR} + P_{UC} - P_{LC}}{P_{UC} - P_{LC}} = \frac{P_{LR} - P_{UR}}{P_{UC} - P_{LC}} + 1, \quad (Eq. 1)$$

provided that ($P_{UC} > P_{LC}$), where $P_{LR}$ is the lower bound (L) for the ith rule (R) predicate (P), $P_{UR}$ is the upper bound (U) for the ith rule (R) predicate (P), $P_{LC}$ is the lower bound (L) for the response predicate (P), and $P_{UC}$ is the upper bound (U) for the response predicate (P).

If ($p(P) \leq 0.0$) however, then:

$$p(P) \leftarrow 1.0, \quad (Eq. 2)$$

else, if($p(P) = 1.0$):

$$p(P) \leftarrow 0.0, \quad (Eq. 3)$$

else, if ($P_{LR} \leq P_{LC}$'$P_{UR}$):

$$p(P) \leftarrow 1.0, \quad (Eq. 4)$$

else:

$$p(P) \leftarrow 0.0. \quad (Eq. 5)$$

Then, the probabilistic range factor, p(R), may be computed by the equation $$p(R) = \prod_{i=1}^{n_j} p(P_i), \quad s.t. \; 0 \leq p(R) \leq 1, \quad (Eq. 6)$$

where n is the number of antecedent predicates in the jth rule, $A_{Lp}$ is the lower bound (L) for the probability (p) in the ith rule action (A), and $A_{Up}$ be the upper bound (U) for the probability (p) in the ith rule action (A). However, if $p(R) < A_{Lp}$ $$A_{Lp} \leftarrow p(R), \quad (Eq. 7)$$

else, if $p(R) > A_{Up}$ $$A_{Up} \leftarrow p(R), \quad (Eq. 8)$$

Then, select $$j \left| \max\left(\frac{A_{Lp} + A_{Up}}{2}\right) \forall \text{ covered rules, } j \, | \, A_{Up} > 0. \quad (Eq. 9) \right.$$

In this example, the response range of A's probabilities lies entirely within the rules range for A for a relative probability of (0−0.1)/(0.7−0.6)=−1.0, which implies 1.0. The response range of B's probabilities lies partly inside and partly outside the rules range for B for a relative probability of (0.05+0.03)/(0.8−0.7)=0.8. The response range of C's probabilities lies entirely outside the rules range for C for a relative probability of (0.8−0.5)/(0.5−0.2)=1.0, which implies 0. If the response were C [0.2, 1.0], then 0 would be correct because the intersection at the low bound of 1.0 accounts for only 0 percent of the area of intersection. If Ri A probability was [0.6, 0.8] and response A probability was [0.7, 0.7], then the response range of A's probabilities would lie entirely within the rules range for A, for a relative probability of (−0.1−0.1)/(0.7−0.7), which would be undefined. However, this result would define a 1.0 probability because the response probability is contained within the rules probability. Similarly, if Ri C probability was [1.0, 1.0] and response C probability was [0.1, 0.1], then the response range of C's probabilities would lie entirely outside the rules range for C for a relative probability of (0.9−0.9)/(0.1−0.1), which would be undefined, but would define a 0 because the response probability is outside the rules probability range. Also, if Ri B probability was [0.7, 0.8] and response B probability was [0.7, 0.8], the response range of B's probabilities would lie entirely inside the rules range for B, for a relative probability of (0−0)/(0.8−0.7)=0, which would imply a probability of 1.0.

The probabilistic range factor may be computed as a product. In the example, the produce is A×B×C=1.0×0.8×0=0. If this number is greater than the upper pj, then it replaces the upper pj. If this number is less than the lower pj, then this bound will be replaced. Thus, the probability of Ri being properly applied by the example response is given by D [0.0, 1.0]. Thus, it is equally likely than not that D is the right output to this response. The midpoint, or 0.50 here, may be used to compare response matches to select the one having the highest probability as the rule to apply, if any, with the tagged consequent. Rules having an upper bound of 0.0 may not be applied to the responses. Rules may be non monotonic in the sense that rule consequents may specify actions and/or ask questions. For example, instead of trying to make an identification, a rule consequent might specify to zoom in on another rule. In some embodiments, a rule consequent might be used as part of a query of a database in order to produce a rule that may be applied.

In some embodiments, rules must have the same right hand side token identifier and overlapping probability ranges (i.e., non-empty range intersection), pj, to be candidates for fusion into one rule. However, in some embodiments, saved analogous rules may have a right hand side pj not equal to [1.0, 1.0]. The union operand may be used for right hand side pj fusion. In some embodiments, rules must have the exact same set of left hand side token identifiers to be candidates for fusion. Further, the intersection of their left hand side range pi cannot be empty for any associated left hand side token identifiers for the fusion into one rule to be allowed. Here, all left hand side pi will be fused using the union operand. In some embodiments, rules may not be fused if the result of fusion leads to a contradiction with at least one existing rule. That is to say, if a response might exist that could fire the newly fused and an existing rule, which would lead to non determinism (i.e., contradiction on the fired consequent), then that fusion may be enjoined. However, such a rule fusion might be subsequently allowed as a result of non-use rule deletion (i.e., least frequently used) or a change of pi.

In some embodiments, valid rules may be matched and applied in preference to rules created by transformational analogy. However, not all rules may be valid. In such a scenario, the most-specific rule—including KASER induced rules, which, in some embodiments, may not necessarily be valid—is preferentially applied. In some embodiments, KASER systems do not change probabilistic ranges. Rather, much like a genetic algorithm, they treat probabilistic ranges as syntactic objects under symbolic transformation. KASER systems may modify the token identifier response as a result of transformation. When in "training" mode, the prediction of a KASER-induced and applied rule may be corrected—leading to a valid rule, which may be subsequently generalized to maximize its applicability. The quality of KASER-induced rules may increase with time, scale, and inherent domain symmetry.

Figure 4:
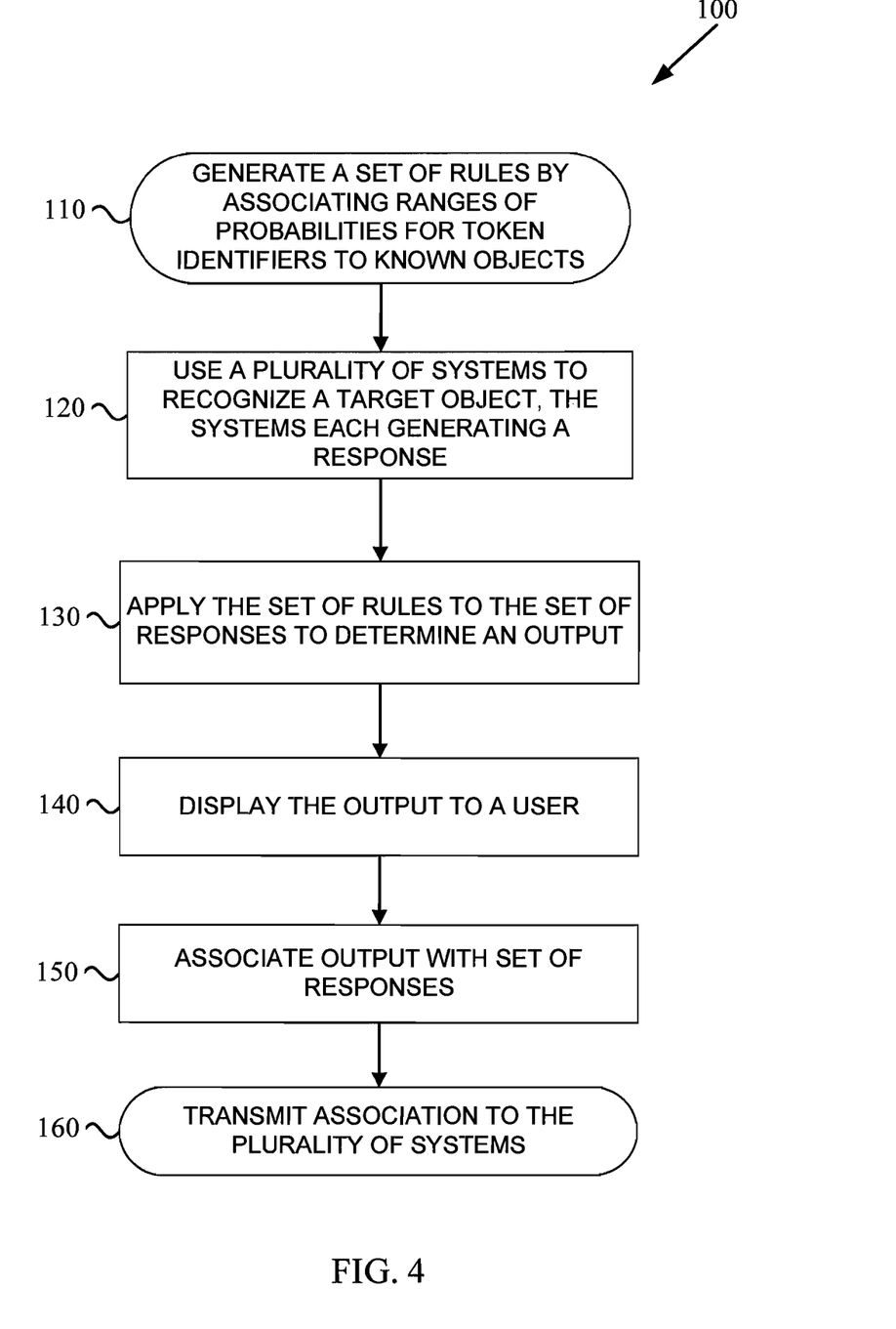
FIG. 4 shows a flowchart of one embodiment of the method for object recognition utilizing fusion of multi-system probabilistic output.

FIG. 4 shows a flowchart of one embodiment of the method for object recognition utilizing fusion of multi-system probabilistic output 100. Method 100 may be performed by a system such as system 200 described in FIG. 5. Method 100 may begin at step 110, where a set of rules is generated. Step 110 may occur in the same manner as step 20. Following step 110, step 120 may involve using the plurality of systems 270 to recognize a target object. Step 120 may occur in the same manner as step 30. Next, step 130 may involve applying the set of rules to the set of responses to determine an output. Step 130 may occur in the same manner as step 40. Following step 40, method 100 may proceed to step 140, wherein the output is displayed to a user. Step 140 may occur in the same manner as step 50. Next, step 150 may involve associating the output with the set of responses generated in step 120. Method 100 may then conclude at step 160, where the association of the output with the set of responses is transmitted to the plurality of systems 270. Step 160 may involve the association of a range of rule probabilities of recognition for one or more rule token identifiers to a known object to enable the plurality of systems to produce responses in accordance with the association, as well as the transmission of the association to the plurality of systems.

Figure 5:
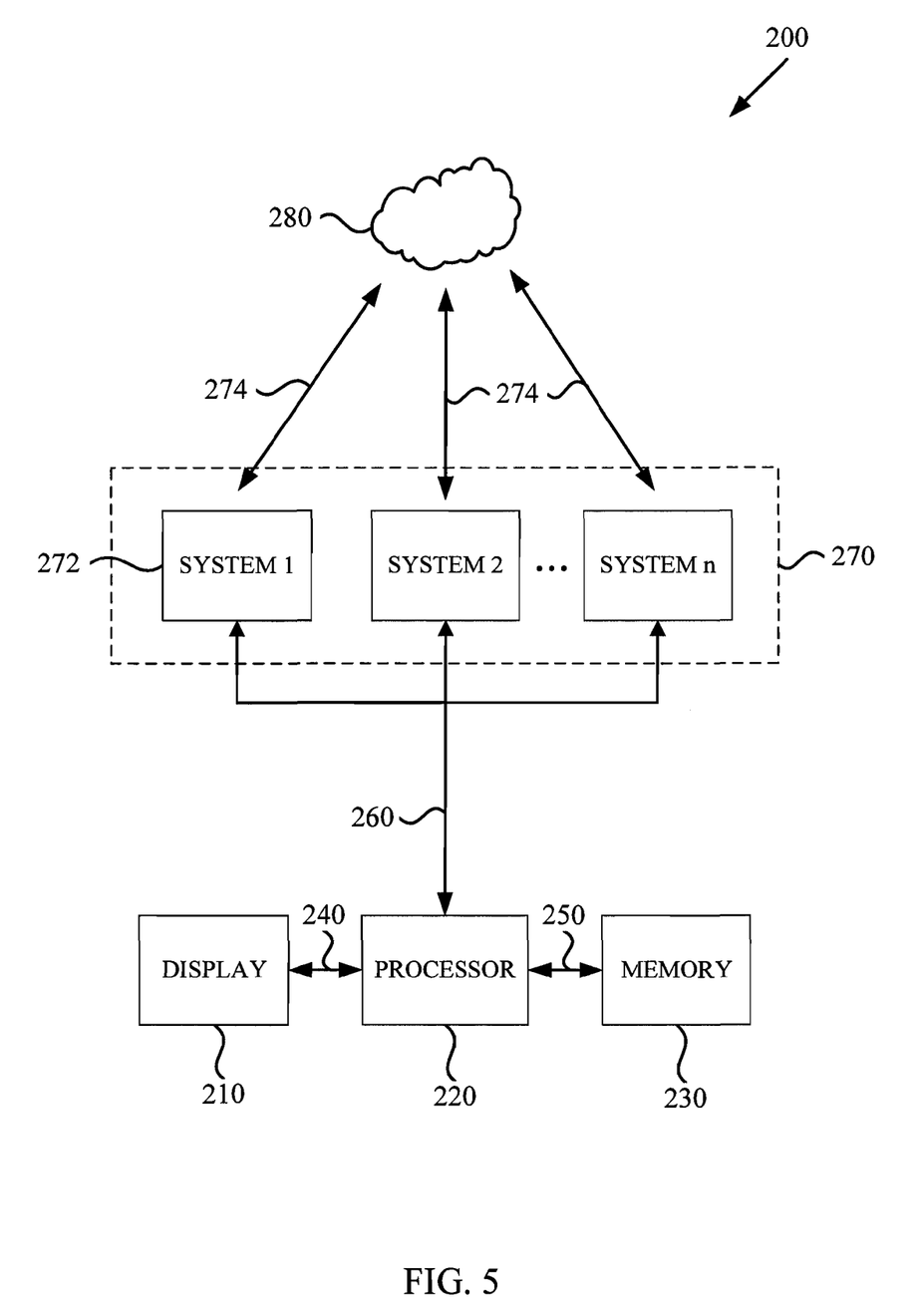
FIG. 5 shows a block diagram of one embodiment of a system for implementing the method for object recognition utilizing fusion of multi-system probabilistic output.

FIG. 5 shows a block diagram of one embodiment of a system 200 for implementing the method for object recognition utilizing fusion of multi-system probabilistic output. System 200 may include a display 210, a processor 220, a memory module 230, and a plurality of systems 270. Display 210 and processor 220 may communicate via connection 240. Processor 220 and memory 230 may communicate via connection 250. Connections 240 and 250 may be wired or wireless. Display 210 may comprise any type of display as recognized by one having ordinary skill in the art. For example, display 210 may be a liquid crystal display, which may be commercially obtained from NEC, model number ASLCD72VX-BK-TA. In some embodiments, processor 220 may comprise any type of processing unit as recognized by one having ordinary skill in the art. For example, processor 220 may be a chip that may be commercially obtained from AMD, model number AMD A64 3200. Processor 220 may retrieve program instructions from memory module 230 to perform steps of method 10 and/or method 100. Processor 220 may also retrieve program instructions from memory module 230 to enable transmission and reception of signals to and from plurality of systems 270 via a data bus 260. Data bus 260 may comprise any commercially available data bus suitable for such a purpose, as recognized by one having ordinary skill in the art. Memory module 230 may comprise any type of memory module as recognized by one having ordinary skill in the art. For example, memory module 230 may be DDR3 SDRAM, which may be commercially obtained from Samsung Corporation. Memory module 230 may contain program instructions stored therein. The program instructions may be executable by processor 220 to perform method 10 and/or method 100. In some embodiments, processor 220 and memory module 230 reside within the same chip.

Plurality of systems 270 may comprise a plurality of separate systems 272, ranging from 1 to n, when n may be any integer greater than zero. The larger the number of systems 272, the more accurately system 200 may be able to recognize a target object 280. Systems 272 may be connected to data bus 260 such that processor 220 may send signals to each of systems 272. Each system 272 may be a "system-of systems," wherein each system 272 contains multiple systems therein. Such a layout may provide for higher-level fusion of rules. Signals may be sent from processor 220 to systems 272 either one at a time or simultaneously. Plurality of systems 270 may comprise a variety of types of systems 272. For example, systems 272 may include one or more vision systems, sonar systems, radar systems, infrared detection systems, heat detection systems, and polarization detection systems. System 200 may be able to more accurately recognize a target object 280 in a quicker manner through the use of multiple types of systems 272. Each of systems 272 may transmit signals 274 to target object 280 to assist in sensing and/or measuring characteristics of target object 280. Each of systems 272 may be stand-alone systems that include software and hardware necessary to allow for the sensing and/or measurement of characteristics of target object 280.

Figure 6:
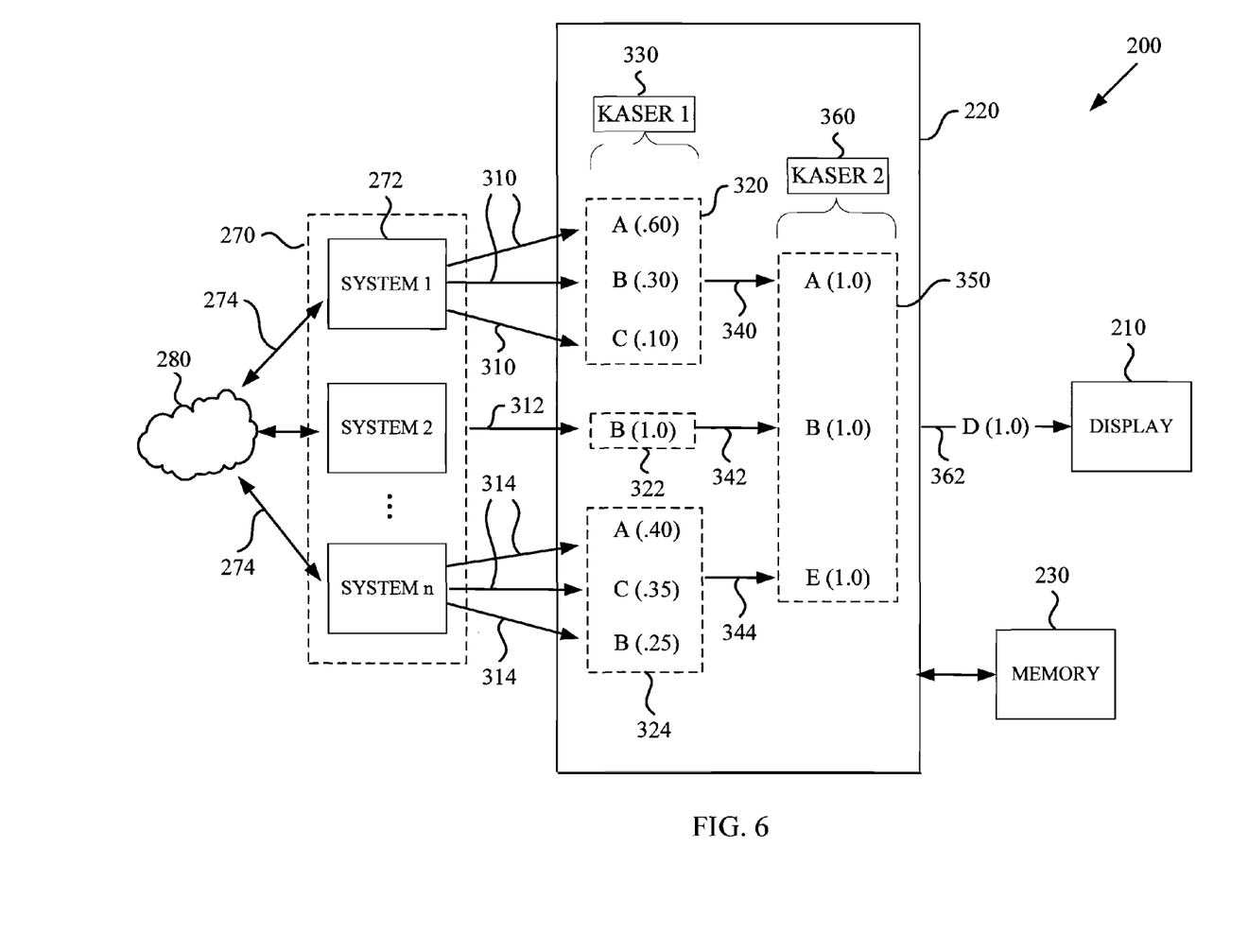
FIG. 6 shows a block diagram of the processing involved in one embodiment of a system for implementing the method for object recognition utilizing fusion of multi-system probabilistic output.

FIG. 6 shows a block diagram of one embodiment of the processing involved in system 200. System 200 may include a processor 220 having the capability to utilize a first processing system, such "KASER 1" 330, and a second processing system, such as "KASER 2" 360. Although system 200 is described with reference to KASER 330 and KASER 360, it should be recognized that other processing systems may be employed within system 200. As used herein, the term "processing system" may refer to any system that may apply a set of rules to data to produce an output. In some embodiments, KASER 330 and KASER 360 may each run the same algorithm. In some embodiments, KASER 330 and KASER 360 may be incorporated into processor 220 or may be stored as program instructions in memory 230, from which processor 220 may retrieve the program instructions to process responses received from plurality of systems 270. In some embodiments, system 200 may only have one KASER system, which may perform the functions of both KASER 330 and KASER 360. In some embodiments, both KASER 330 and KASER 360 may perform fusion of rules by analogy. In some embodiments, to operate system 200, systems 272 may receive signals 274 from a target object 280. Signals 274 may be emitted or reflected from target object 280 in response to signals initiated from systems 272. Each of systems 272 may process signals 274 and produce responses, such as responses 310, 312, and 314, for transmission to processor 220. Each system 272 may produce one or a plurality of responses. As shown, "system 1" produces three responses 310, "system 2" produces one response 312, and "system n" produces three responses "314".

In some embodiments, the responses of each system 272 may be stored in a table, where each response may be assigned a lowest and highest associated probability. Initially, each probability may be set to an unrealistic value (e.g., −1.0), which may serve as a marker to indicate non-initialization. Then, for each runtime response of each system 272, if the probability is less than the table's assigned low probability or is greater than its assigned high probability, the table probability may be updated with that of the runtime response. For example, a response of A[−1.0, −1.0] may be changed to a non-negative pairing in the first assignment. Then, only responses having non-negative response probabilities of recognition may be defined for the inputs to processor 220. The assigned probabilistic ranges may serve to initially fuse the probabilistic responses of each distinct system 272.

Responses 310, 312, and 314 may comprise a response token identifier along with a response probability of recognition associated with each response token identifier. For example, "system 1" may produce three responses 310. The first response may identify target object 280 as being object "A" (response token identifier) with a probability of 60% (response probability of recognition), object "B" with a probability of 30%, and object "C" with a probability of 10%. "System 2" may produce one response 312 identifying target object 280 as being object "B" with a probability of 100%. "System n" may produce three responses 314, with the first identifying target object 280 as being object "A" with a probability of 40%, object "C" with a probability of 35%, and object "B" with a probability of 25%.

Responses 310, 312, and 314 may be received by processor 220 and may be initially processed by KASER 330. KASER 330 may group and process responses from each system 272 to produce KASER 1 output responses. For example, KASER 330 may group responses 310 into a first set of responses 320, responses 312 into a second set of responses 322, and responses 314 into a third set of responses 324. KASER 330 may then apply a set of rules to first set of responses 320 to produce a first KASER 2 input 340, apply the set of rules to second set of responses 322 to produce a second KASER 2 input 342, and apply the set of rules to third set of responses 324 to produce a third KASER 2 input 344. For example, first KASER 2 input 340 may identify target object 280 as being object "A" with a response probability of recognition of 100%, second KASER 2 input 342 may identify target object 280 as being object "B" with a response probability of recognition of 100%, and third KASER 2 input 344 may identify target object 280 as being object "E" with a response probability of recognition of 60%.

Next, KASER 360 may then apply the set of rules to inputs 340, 342, and 344 to produce a processor output 362. As an example, processor output 362 may identify target object 280 as being "D" with a probability of recognition of 100%. Processor output 362 may then be transmitted to display 210 so it can be viewed by a user. In some embodiments, processor output 362 may comprise object values that are not recognized by plurality of systems 272. For example, as shown, processor output 362 is identified as being object "D", although none of responses 310, 312, or 314 identified target object 280 as being object "D". This result may occur due to user feedback during the training of system 200, wherein if some or all of plurality of systems 272 misidentify a target object 280, a user may "train" system 200 to produce the proper result based on the incorrect identifications.

For example, as shown in the FIG. 6, "system n" identifies target object 280 as objects A (0.40), B(0.25), and C(0.35). If however, object 280 is in reality object E, a KASER 330 may be modified such that whenever responses of A(0.40), B(0.25), and C(0.35) are received by KASER 330, an output of E (1.0) is produced. A user may modify KASER 330 and/or KASER 360 by providing feedback to KASER 330 and/or KASER 360, each of which may then "learn" the proper output signal. In some embodiments, a user may provide direct and/or indirect feedback to each of systems 272 via data bus 260 (see FIG. 5), such that each system 272 may produce output signals in accordance with user instruction. In some embodiments, training may begin with the "topmost" KASER (e.g. KASER 360 in FIG. 6). For example, a user may modify KASER 360 to produce an output 362 of D(1.0) whenever a combination of response inputs of A(1.0), B(1.0), and E(1.0) are received. Then, a user may modify KASER 330 to produce input 340 of A(1.0) when a combination of responses of A(0.60), B(0.30), and C(0.10) are received, input 342 of B(1.0) when a response of B(1.0) is received, and input 344 of E(1.0) when a combination of responses of A(0.40), C(0.35), and B(0.25) are received. Two layers of probabilistic learning, such as that shown in FIG. 6, may provide for faster learning than other systems, as conventional systems cannot learn by analogy and cannot readily scale.

Figure 7:
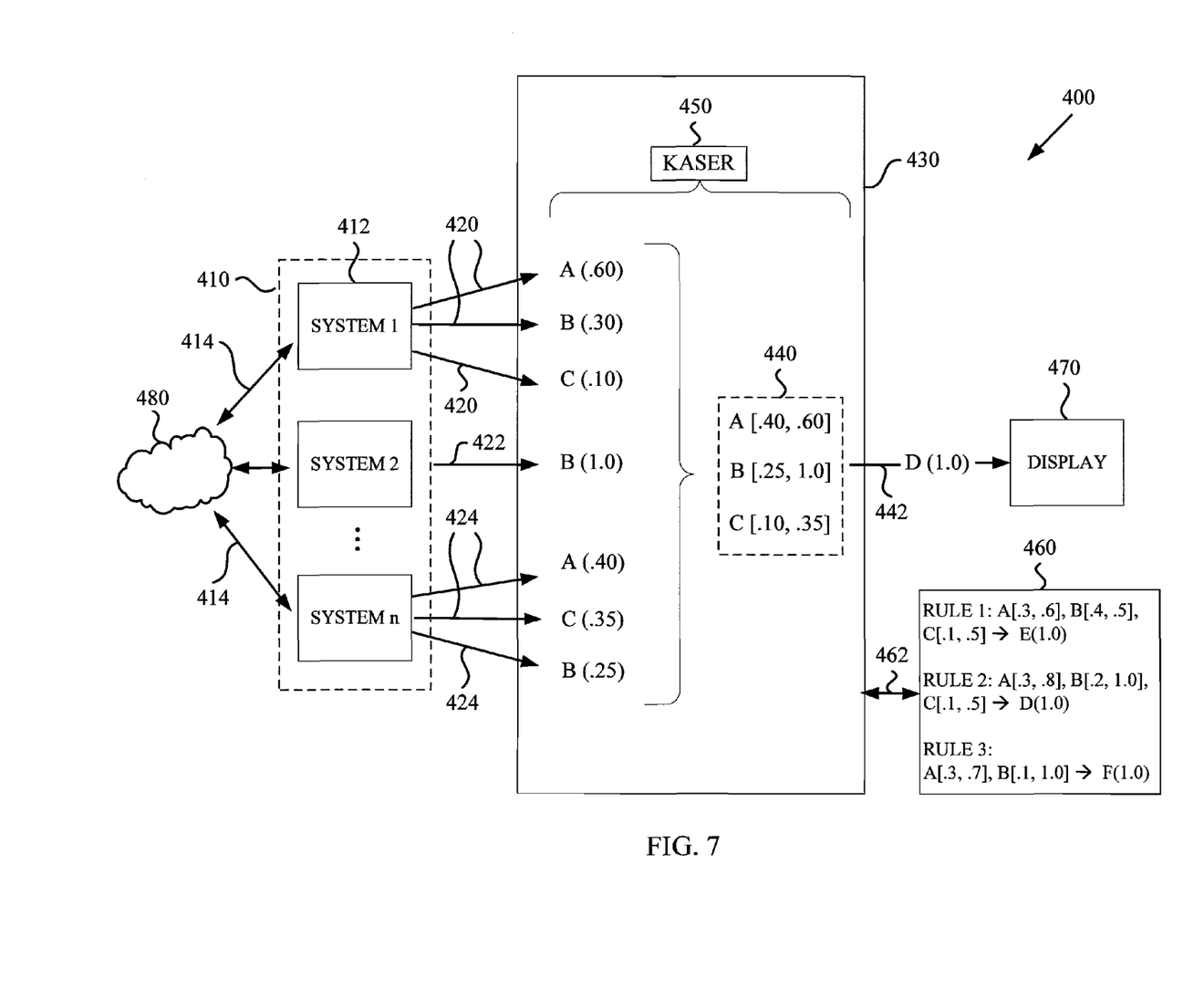
FIG. 7 shows a block diagram of the processing involved in another embodiment of a system for implementing the method for object recognition utilizing fusion of multi-system probabilistic output.

FIG. 7 shows a block diagram of the processing involved in one embodiment of a system 400 for implementing the method for object recognition utilizing fusion of multi-system probabilistic output. System 400 may implement both methods 10 and 100. System 400 may include a plurality of systems 410, a processor 430, memory 460, and a display 470. Plurality of systems 410 may comprise a plurality of individual systems 412. Plurality of systems 410 may be similar to plurality of systems 270, with systems 412 similar to systems 272. Each of systems 412, from 1 to n, may transmit responses 420, 422, and 424, respectively, to processor 430. Memory 460 may be similar to memory 230 and display 470 may be similar to display 210. Processor 430 may comprise any type of processing unit as recognized by one having ordinary skill in the art. For example, processor 430 may be a chip such as that which may be commercially obtained from AMD, model number AMD A64 3200. Processor 430 may retrieve program instructions from memory 460 to perform steps of method 10 and/or method 100. Processor 430 may also retrieve program instructions from memory 460 to enable transmission and reception of signals to and from plurality of systems 410 via a data bus (not shown).

In some embodiments, system 400 includes a processor 430 having the capability to utilize a processing system. As an example, system 400 may be capable of running a system such as "KASER" 450. KASER 450 may group and process responses from each system 412 to produce a processor output 442. For example, KASER 450 may group responses 420, 422, and 424 into a set of responses 440. Set of responses 440 may comprise a response token identifier (e.g. A, B, C), along with a response probability of recognition range (e.g. [0.4, 0.6], [0.25, 1.0], and [0.10, 0.35]) associated with each response token identifier. KASER 450 may then apply a set of rules (e.g. Rule 1, Rule 2, Rule 3) located in memory 460 to set of responses 440 to produce output 442. Processor 430 may communicate with memory 460 via connection 462, which may be a wired or wireless connection. The set of rules located in memory 460 may be generated as discussed above with respect to methods 10 and 100 and system 200. As shown, Rule 2 is the most-specific rule that covers set of responses 440, as each response token identifier matches each rule token identifier and each response range of probability of recognition is contained within each rule range of probability of recognition for each respective token identifier. Thus, output 442 will comprise a consequent token identifier D with a consequent probability of recognition of 1.0. Similar to system 200, system 400 may have a "training" mode and a "usage" mode. While in training mode, a user may "train" system 400 to produce the proper result, similar to the training described with respect to system 200.

Many modifications and variations of the system and method for object recognition utilizing fusion of multi-system probabilistic output are possible in light of the above description. Further, the scope of the claims is not limited to the embodiments disclosed herein, but extends to other embodiments as may be contemplated by those with ordinary skill in the art.

I claim:

1. An object recognition system comprising:
    a display;
    a processor operatively connected to the display; and
    a memory module operatively connected to the processor, the memory module having program instructions stored therein, wherein the program instructions are executable by the processor to perform a method for object recognition comprising the steps of:
        generating a set of rules, each rule of the set of rules containing one or more predicates and a consequent, each of the predicates comprising a rule token identifier and a rule probability of recognition associated with the rule token identifier, the rule token identifiers generated from a plurality of systems, each rule token identifier representing a recognized object by at least one of the systems, each rule of the set of rules derived by associating a range of rule probabilities of recognition for one or more rule token identifiers to a known object, wherein the range of rule probabilities of recognition for each rule token identifier is determined by combining multiple rule probabilities of recognition for each rule token identifier, each rule probability of recognition determined by at least one of the systems,
        using the plurality of systems to recognize a target object, each system producing a response, the response comprising at least one response token identifier and a response probability of recognition associated with each response token identifier, wherein each response is combined to form a set of responses,
        applying the set of rules to the set of responses to determine an output, wherein the output comprises an identification of a known object and an identification probability of recognition associated with the known object, and
        displaying the output to a user on the display.

2. The object recognition system of claim 1, wherein each system is configured to measure a different characteristic of the target object.

3. The object recognition system of claim 2, wherein the different characteristics include sound, polarization of reflected light, and heat.

4. The object recognition system of claim 1, wherein the step of applying the set of rules to the set of responses to determine an output comprises the steps of:
    determining if a set of responses matches at least one rule, wherein a set of responses matches a rule if each response token identifier and associated response probability of recognition of the set of responses are all found among the predicates of the rule and the rule probabilities of recognition overlap the response probabilities of recognition for each of the response token identifiers;
    if a set of responses matches at least one rule, then determining the most-specific matched rule; and
    applying the most-specific matched rule to determine an output.

5. The object recognition system of claim 4, wherein if a set of responses does not match at least one rule, the method further comprises the step of determining if all of the response token identifiers of the set of responses are all found among the predicates of the rule.

6. The object recognition system of claim 5, wherein if all of the response token identifiers are not found among the predicates of the matched rule, the method further comprises the steps of:
    generating a rule containing the response token identifier and associated response probability of recognition that is not found among the predicates of the matched rule; and
    comparing the set of responses to the generated rule.

7. The object recognition system of claim 6, wherein the generated rule contains a different predicate and different consequent than the matched rule.

8. The object recognition system of claim 6, wherein the rule is generated by transformative analogy of existing rules.

9. The object recognition system of claim 6, wherein the step of generating a rule by transformative analogy of existing rules includes the step of combining existing rules having identical rule token identifiers, identical consequents, and overlapping predicate rule probabilities of recognition.

10. The object recognition system of claim 9, wherein the existing rules are not combined if the generated rule contradicts an existing rule.

11. The object recognition system of claim 6, wherein if all of the response token identifiers of the set of responses are found among the predicates of the rule, the method further comprises the step of determining if all of the rule probabilities of recognition are at least partially contained within the response probabilities of recognition for each response token identifier of the set of responses.

12. The object recognition system of claim 11, wherein if all of the rule probabilities of recognition are at least partially contained within the response probabilities of recognition for each response token identifier of the set of responses, the method further comprises the steps of:
    determining the rule having the highest output probability; and
    applying the rule having the highest output probability to determine an output.

13. The object recognition system of claim 12, wherein the consequent of each rule contains a consequent probability of recognition having a lower probability bound and an upper probability bound.

14. The object recognition system of claim 13, wherein the step of determining the output having the highest probability comprises the steps of:
    for each matched rule, calculating the percentage of overlap between the response probability of recognition for each response token identifier in the set of responses to the rule probability of recognition of the corresponding predicate in the rule, the calculation resulting in an overlap probability for each predicate of each matched rule;
    calculating the product of the overlap rule probabilities of recognition for each rule, resulting in an output probability for each rule;
    determining if the output probability is smaller than the lower probability bound, if the output probability is smaller than the lower probability bound, then replacing the lower probability bound with the output probability;

determining if the output probability is larger than the higher probability bound, if the output probability is larger than the higher probability bound, then replacing the higher probability bound with the output probability;

calculating the midpoint value of the consequent probability of recognition; and selecting the rule having the largest midpoint value.

15. The object recognition system of claim 11, wherein if all of the rule probabilities of recognition in each of the predicates of the rule are not at least partially contained within the response probabilities of recognition for each of the response token identifiers of the set of responses, the method further comprises the steps of:

generating a rule containing the response token identifier that is not found among the predicates of the matched rule; and comparing the set of responses to the generated rule.

16. The object recognition system of claim 1, wherein the range of rule probabilities of recognition is determined by the lowest rule probability of recognition and the highest rule probability of recognition for each rule token identifier.

17. The object recognition system of claim 1, wherein the output is selected from a group of outputs stored in an object-oriented multimedia database.

18. The object recognition system of claim 1, wherein the association of a range of rule probabilities of recognition for one or more rule token identifiers to a known object is transmitted to the plurality of systems to enable the plurality of systems to produce responses in accordance with the association.

19. The object recognition system of claim 1, wherein the plurality of systems generate the rule token identifiers by comparing characteristics of the target object with knowledge bases containing characteristics of known objects.

20. The object recognition system of claim 1, wherein the method further comprises the steps of:

associating the output with the set of responses; and transmitting the association to the plurality of systems.

21. An object recognition system comprising:

a display;

a processor operatively connected to the display; and a memory module operatively connected to the processor, the memory module having program instructions stored therein, wherein the program instructions are executable by the processor to perform a method for object recognition comprising the steps of:

generating a set of rules, each rule of the set of rules containing one or more predicates and a consequent, each of the predicates comprising a rule token identifier and a rule probability of recognition associated with the rule token identifier, the rule token identifiers generated from a plurality of systems, each rule token identifier representing a recognized object by at least one of the systems, each rule of the set of rules derived by associating a range of rule probabilities of recognition for one or more rule token identifiers to a known object, wherein the range of rule probabilities of recognition for each rule token identifier is determined by combining multiple rule probabilities of recognition for each rule token identifier, each rule probability of recognition determined by at least one of the systems, using the plurality of systems to recognize a target object, each system producing a response, the response comprising at least one response token identifier and a response probability of recognition associated with each response token identifier, wherein each response is combined to form a set of responses, applying the set of rules to the set of responses to determine an output, the output comprising an identification of a known object and an identification probability of recognition associated with the known object, wherein the output is selected from a group of outputs stored in an object-oriented multimedia database, displaying the output to a user, associating the output with the set of responses, and transmitting the association to the plurality of systems to enable the plurality of systems to produce responses in accordance with the association.

22. An object recognition system comprising:

a display;

a processor operatively connected to the display; and a memory module operatively connected to the processor, the memory module having program instructions stored therein, wherein the program instructions are executable by the processor to perform a method for object recognition comprising the steps of:

generating a set of rules, each rule of the set of rules containing one or more predicates and a consequent, each of the predicates comprising a rule token identifier and a rule probability of recognition associated with the rule token identifier, the rule token identifiers generated from a plurality of systems, each rule token identifier representing a recognized object by at least one of the systems, each rule of the set of rules derived by associating a range of rule probabilities of recognition for one or more rule token identifiers to a known object, wherein the range of rule probabilities of recognition for each rule token identifier is determined by combining multiple rule probabilities of recognition for each rule token identifier, each rule probability of recognition determined by at least one of the systems;

using the plurality of systems to recognize a target object, wherein each system is configured to measure a different characteristic of the target object, each system producing a response, the response comprising at least one response token identifier and a response probability of recognition associated with each response token identifier, wherein each response is combined to form a set of responses;

applying the set of rules to the set of responses to determine an output; and displaying the output to a user on the display.

\* \* \* \* \*